United States Patent [19]

Ghose et al.

[11] Patent Number: 6,114,983
[45] Date of Patent: Sep. 5, 2000

[54] ELECTRONIC COUNTER MEASURES IN RADAR

[75] Inventors: Rabindra N. Ghose, Los Angeles; Walter A. Sauter, Malibu, both of Calif.

[73] Assignee: American Nucleonics Corporation, Westlake Village, Calif.

[21] Appl. No.: 05/833,590

[22] Filed: Sep. 15, 1977

[51] Int. Cl.⁷ ............................................. G01S 7/36
[52] U.S. Cl. ..................... 342/16; 342/17; 342/159; 342/188
[58] Field of Search .................... 343/18 E, 100 PE; 325/65, 371, 476; 342/13, 16, 17, 18, 89

[56] References Cited

U.S. PATENT DOCUMENTS

| | | | |
|---|---|---|---|
| 3,044,062 | 7/1962 | Katzin | 343/100 PE |
| 3,093,824 | 6/1963 | Ammerman | 343/100 PE |
| 3,849,781 | 11/1974 | Ort | 343/18 E |
| 3,883,872 | 5/1975 | Fletcher et al. | 343/100 PE |
| 3,963,990 | 6/1976 | DiFonzo | 325/476 |

*Primary Examiner*—John B. Sotomayor
*Attorney, Agent, or Firm*—Hoffmann & Baron, LLP

[57] ABSTRACT

Apparatus and method for eliminating an interference signal from a desired signal where a difference of polarization exists or can be made to exist. The desired signal is received on a first antenna of appropriate polarization and the interference signal is received via another port of the same antenna or a second antenna polarized ninety degrees away from the first. The signal received via the other polarization is adjusted for amplitude and phase so that all interference will be cancelled when both signals are subtracted in a summing junction. In the case where the interference and desired signals do not have polarization differences, provision is made to change the polarization of the desired signal.

2 Claims, 2 Drawing Sheets

ELECTRONIC COUNTER MEASURES IN RADAR

PRIOR ART STATEMENT

The three patents described below relate to the interference cancellation techniques described in this application.

U.S. Pat. No. 3,699,444, INTERFERENCE CANCELLATION SYSTEM, describes a radar system circuit which uses a portion of the transmitted signal, after phase shifting and attenuation, to cancel the transmitted signal received at the receiver antenna.

U.S. Pat. No. 3,716,863, INSTRUMENT LANDING ERROR CORRECTING SYSTEM described apparatus for cancelling an interfering signal coherent with the desired signal, but varying in amplitude and phase.

U.S. Pat. No. 4,016,516, REFLECTIVE SIGNAL CONTROLLER, describes a circuit for varying the amplitude and polarity of an rf signal. Parts of said circuit may be of use in this inventive application.

None of the above references teaches or suggests a technique for cancelling interference based on a difference of polarization between it and the desired signal.

BACKGROUND OF THE INVENTION

Described herein is apparatus for preventing the jamming of radar by an electronic countermeasure (ECM) jamming or interference signal; and more particularly, apparatus for receiving two or more different polarizations of the radar return signal and the interference signal, and using that different polarization received signal to cancel the interference signal without also cancelling the desired radar return signal.

It is common for radar systems to be jammed by hostile electronic countermeasure interference signal sources. These electronic countermeasure systems typically monitor the radar band, accurately determine the frequency, pulse repetition rate another radar system characteristics, and transmit interfering signals of sufficient power and of appropriate timing to render the radar inoperative. These countermeasure systems operate in real time so that a change of radar frequency will instantaneously be followed by a change of interference frequency. Therefore, some method of interference avoidance is required what will act to cancel interference, both pulsed and continuous, even at the exact frequency of the radar system.

The prior art includes U.S. Pat. No. 3,716,863, INSTRUMENT LANDING ERROR CORRECTION SYSTEM, commonly assigned, which cancels an interference signal by producing a correction signal of equal frequency and amplitude but of appropriate polarity. When the interference, correction and desired signals are received and summed, the interference signal is cancelled and the desired signal remains. This system is useful where the desired and interference signals are of the same frequency and are coherent but differ in phase. An example is an aircraft receiving an ILS signal directly from a transmitter and simultaneously receiving a reflected ILS signal from a nearby structure.

A system employing this principle may employ a circuit for varying the basic signal phase and amplitude to produce a correction signal. Such a circuit is described in U.S. Pat. No. 4,016,516, REFLECTIVE SIGNAL CONTROLLER, commonly assigned. This signal controller is designed to be inserted into the path between a source and the utilization device to allow the control of signal amplitude ratio and polarity.

The prior art thus recognizes the problem of interfering signals of the same frequency, and describes the generation of a correction signal of appropriate phase to cancel said interference. This is possible since the correction signal generator is coupled to, and therefore is coherent with the interference signal source.

In the case where the interference signal is produced by an electronic counter measure source (ECM), however, there can be no coupling to the source to generate a coherent correction signal, and cancellation of a jamming signal is not feasible by this method.

An alternative is to cancel such interference by taking advantage of the difference in signal polarization between desired and interference signals. This technique uses circuits equivalent to those required by prior cancellation systems, but requires a different antenna installation. In the case where the interference and desired signals do not have polarization differences, provision is made to change the polarization of the desired signal.

SUMMARY OF THE INVENTION

The proposed system comprises a receiver equipped with two receiving antenna ports, each configured to receive waves at a particular polarization, the two polarizations being ninety degrees out of phase with each other. For example, one could be configured to receive vertically (V) polarized waves and the other, horizontal (H). Then, to the extent that the ratios in the interference and radar return signals are different at the V and H receive ports, a cancellation signal can be obtained by adjusting the amplitude ratio and electrical phase angle of the V or H receive port signal that does not normally receive the desired signal. Therefore, cancellation of the interference signals only can be provided even if the desired and interference signals are at the same frequency.

This system can function wherever the desired versus interference ratios are not the same at the two polarization ports. This would be true if the interference were vertically polarized and the desired signals horizontally, for instance. Also, the interference may be circularly polarized and the desired signal, vertically. In the latter case, the horizontally polarized antenna would receive the interference while the vertically polarized antenna would receive both interference and desired signals. A signal received via one channel (port) could be used on the other channel for interference cancellation.

In the case where the interference signals polarization angle is matched to that of a desired radar signal, the radar polarization angle may be changed by the operator to avoid cancellation of the desired radar signals. In the case where the energy is radiated from a radar antenna, the polarization of the radiated signal could be rotated through the use of the appropriate waveguide "plumbing". The system will then again operate as stated above.

One variation that the system has to compensate for is the ratio of received interference signal power received by each antenna port. For instance, circularly polarized interference has equal amounts of horizontally and vertically polarized signal power. Therefore, the same amount of interference power received at one antenna port has to be subtracted from the signal received at the other antenna port. On the other hand, horizontally polarized interference would provide a relatively small amount of interference at the vertical antenna port. This system variable is the amplitude ratio between the channels. The system automatically reduces (or increases) the amplitude ratio required to provide interference cancellation.

Another system variable is the amount of time or phase delay between channels. The same interference signal may be received by one receiving antenna port a fraction of a wavelength ahead of the other. To compensate, an electrical phase angle and/or a variable delay in the system is provided, so that cancellation signals are produced with the proper electrical phase angle to cancel the interference optimally.

Both the phase and amplitude ratio control circuits are monitored and, to the extent that perfect cancellation was not produced, error signals are generated. These error signals are then fed back to the phase and amplitude control circuits, closing the loops to make automatic system corrections.

Therefore, an object of this invention is to protect a radar receiver from interference by differentiating between normal returns and interference, based on differences between their polarizations and to cancel the interference thus detected.

DESCRIPTION OF THE PREFERRED EMBODIMENT

Figure 1:
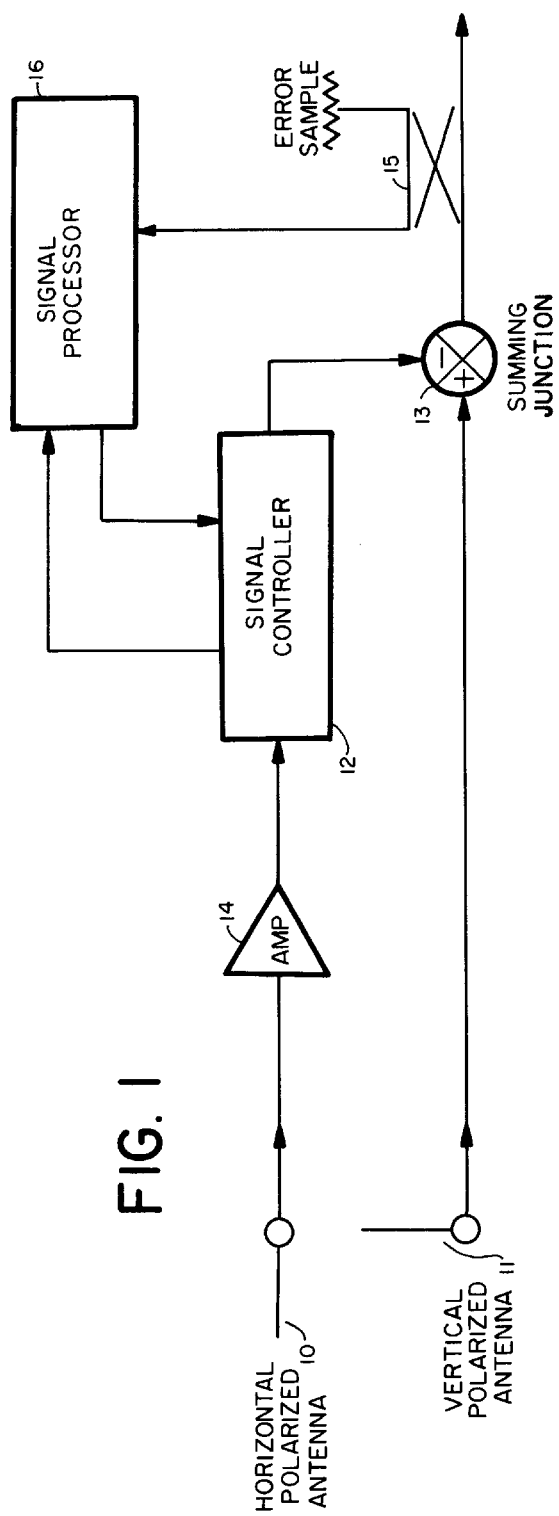
FIG. 1 is a simplified block diagram of a portion of a receiver system incorporating this interference cancellation circuit.

FIG. 1 contains the main components of the interference cancellation system, including vertically polarized 10 and horizontally polarized 11 antennas or antenna ports. The invention utilizes a discrimination concept for the desired and interference signals based on their polarization and is, therefore, not constrained by the directions of arrival of the desired signal and the interference. Consequently, the discrimination means encompassed by the invention accommodates friendly and hostile interference arriving through both mainlobes and sidelobes.

Another aspect of this invention based in its polarization discrimination capabilities is that the adaptive nature of the counter-countermeasure provision makes the interference suppression in the receiver useful even for moving receivers and interference sources. This is true for two reasons. First, the ratio of received interference power between antennas and the interference delay between antennas will not vary rapidly. Moreover, to the extent that there may be a variation, the closed loop error detecting circuits will automatically compensate for the variation.

If the interference source is a circularly polarized signal in the same frequency band as the receiver, and if the desired received signal is vertically polarized; there will be a strong horizontal component of the interference while the horizontal component of the desired signal will be negligible. Even if there is de-polarization in the medium, the relative magnitude of the ratio of the desired signal appearing as a horizontally polarized field component will be significantly lower than the ratio of the horizontal and vertical fields of a circularly polarized jamming signal or interference. In the invention, means are provided to receive the orthoginal (horizontal) component of the incoming field in addition to the normal (vertical) component such that the antenna aperture available to both vertical and horizontal ports is the same. In other words, the effective receive antenna gains for the vertical and horizontal polarizations are the same or nearly the same.

The signal or interference as received by the horizontal port 10 of the antenna feed is the source for the synthesis of the interference as it appears at the vertical port 11 of the receive antenna. This is due to the fact that the horizontal and vertical components of the jamming signal are correlated, except perhaps by an amplitude ratio factor and a phase or time delay. The amplitude ratio factor could be due to the differential proportion characteristics of the interference through the medium and the relative antenna orientations. The delay between the vertical and horizontal component of the interference appearing at the radar receive antenna could also be due to similar reasons.

It is evident, therefore, that if an appropriate amplitude ratio factor and a phase or time delay are introduced as transfer functions of the signal controller 12, as shown in FIG. 1, the output of the signal controller will be a cancellation signal which is identically the same as the interference appearing at the vertical port of the receive antenna. The subtraction of these two signals, shown in FIG. 1, then will yield an output where the interference is cancelled but the desired signal is not, since the cancellation of the desired signal cannot occur due to its "negligible" level at the output of the signal controller. If the synthesized transfer function characteristic of the signal controller, that is the amplitude ratio factor K and time (or phase) delay T, are not exactly what are required, the difference between the synthesized cancelling signal and the interference will not be zero. This nonzero residual interference signal then can be used as the error signal of a high-gain servo-loop that drives the factors K and T until the error signal vanishes. The equilibrium condition for the loop then assures the absence of the interference at the receive line.

These functions are accomplished by the apparatus of FIG. 1 as follows: Both horizontally and vertically polarized antenna ports 10 and 11 receive rf energy. One antenna port (the horizontally polarized antenna in FIG. 1) supplies its output to an amplifier 14 and signal controller 12, the latter being used to generate the appropriate power and delay parameters described above.

A signal controller capable of receiving an rf signal, or either attenuating or amplifying it, and of varying the amount of delay between the controller input and output are old in the art. See, for example, U.S. Pat. No. 4,016,516 commonly assigned, for a detailed description of the signal controller for this application, and which is incorporated by reference herein.

The signal controller output is adjusted for amplitude ratio and delay. This is then subtracted from the vertical port signals in the summing junction 13.

The output of the summing junction 13 is the correct signal with the interference deleted. For example, if the interference was received mainly at the horizontal antenna, and the desired signal at the vertical; the output of the signal controller would be adjusted to output the proper amplitude and phase to cancel the interference in the vertical component.

An error sampling determination is made at a sampler at the output of the summing junction 13. Uncompensated errors in the form of rf signal levels are used as inputs to a signal processor 16. These signals are analyzed for their amplitude and delay relationship to the received interference signals, and correction signals would be applied to the signal controller 12 to more accurately cancel the interference, thus closing the error detection loops. An example of a circuit used for cancelling interference not identical to the desired signal in amplitude and phase is described in U.S. Pat. No. 3,716,863, which is incorporated by reference herein.

Figure 2:
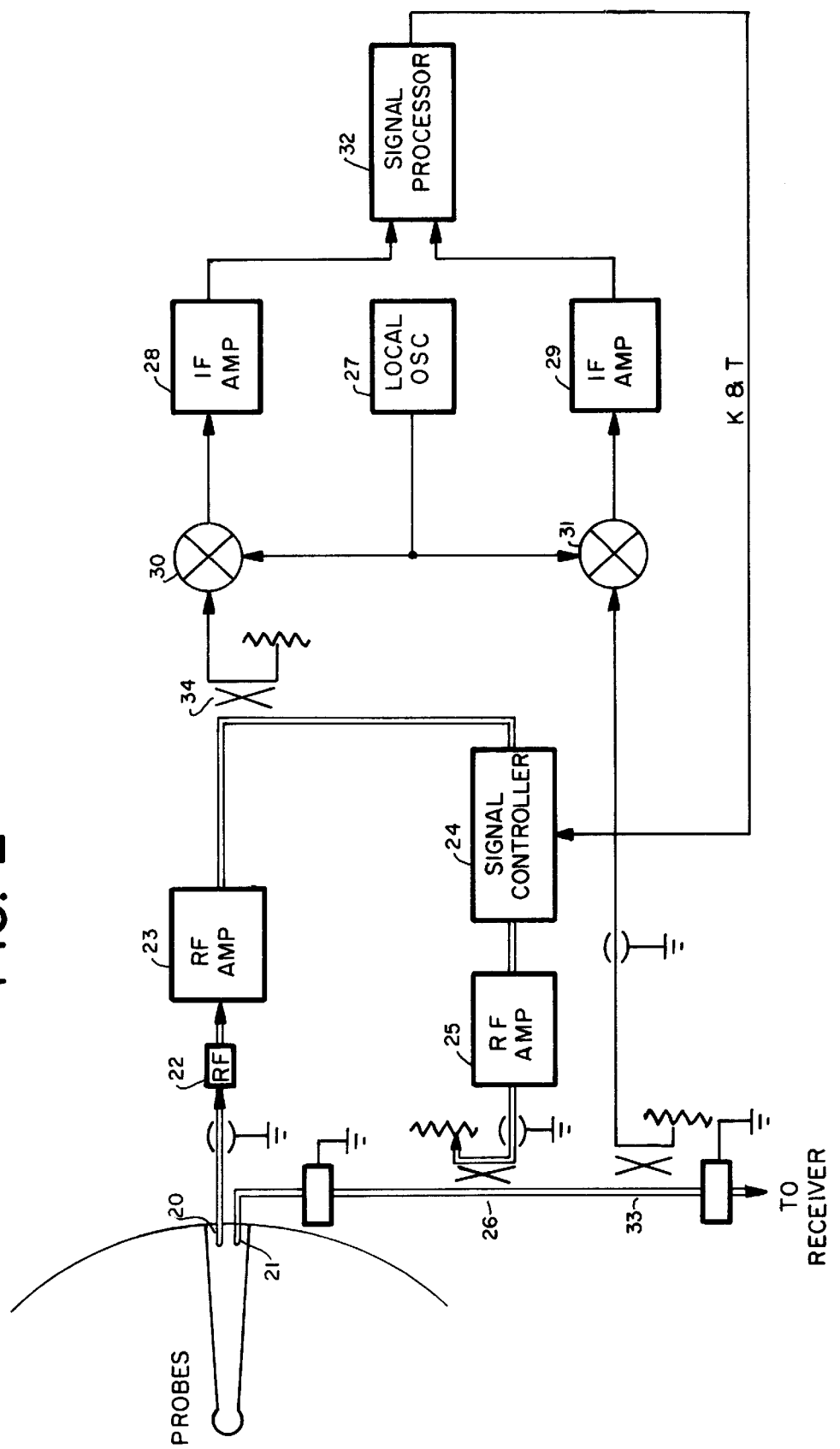
FIG. 2 is a detailed diagram of this system, where the amplitude ratio and phase corrections are processed at the intermediate frequency stage.

FIG. 2 shows an actual implementation plan for a vertically polarized radar. In this figure, the signal processing part of the servoloop, referred to above, is effective at some "intermediate frequency" instead of at the radar receive frequency.

Two probes are mounted in the antenna, one with horizontal polarization and the other, vertical. The horizontally polarized component 20 is coupled through an rf limiter 22 and amplifier 23 to a signal controller 24 which varies its amplitude ratio and phase angle (or time delay). The adjusted output is then injected into the vertically polarized channel through an rf amplifier 25 and coupler 26 to cancel out the interference signal received. The resultant signal is transmitted to the receiver where it is used as a regular received signal.

The error signal feedback loop in this embodiment comprises the remainder of the circuit. The orthogonally polarized component is summed through coupler 34 with the local oscillator 27 output at junction 30 and the difference resulting is amplified in an IF amplifier 28. Similarly, a sampling of the signal being transmitted to the receiver, already corrected for interference, is summed with the same local oscillator 27 output at junction 31 and is applied to another IF amplifier 29. Finally, both IF outputs are compared in the signal processor 32. To the extent that a residual interference signal remains in the corrected signal from the sampling coupler 33, an additional correction is generated by the signal processor 32, and applied to the signal controller 24 to correct for the uncompensated error.

The signal processor 32 of FIG. 2 may be implemented in any of several well known ways to produce the amplitude (K) and time delay (T) output signals. One technique for generating these factors is to do so at a time when the desired signal is known to be absent. By definition, the only remaining signal is the undesired one. At this time, the outputs of both ports could be applied to an amplitude comparator for producing an amplitude correction signal K, and simultaneously both signals could be applied to a phase comparator generating a phase correction signal T. One time when the desired signal is normally absent in a radar is before the pulse transmission during which time reflected pulses are no longer being received. Additional circuits could be added to disable the transmitter and enable the signal processor to any time under operator control.

A manual control may also be provided so that the operator could adjust K and T while observing the radar scanner, manually tuning for minimum interference.

Figure 3:
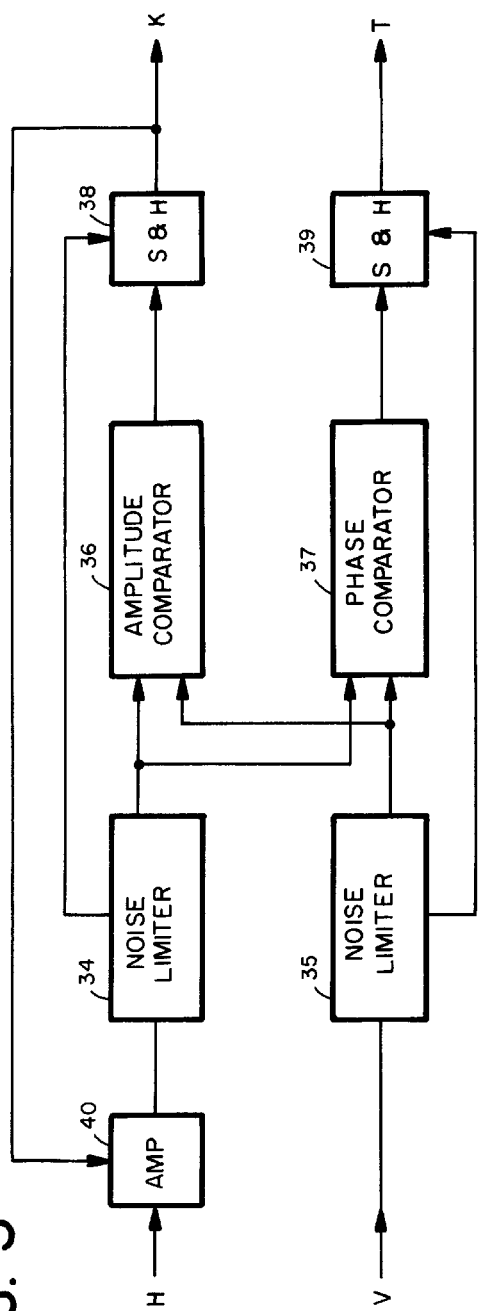
FIG. 3 is a schematic diagram of one signal processor embodiment.

FIG. 3 is a simplified schematic diagram of one automatic signal processor embodiment. Both channels comprise a noise limiter 34 and 35 so that the circuit will not react to random noise, but will react only to received signals large enough to overcome a predetermined threshold. Both channel signals are compared on the basis of amplitude and phase, the outputs being K and T correction signals of appropriate polarity and amplitude which, when applied through the complete signal controller, will result in the complete cancellation of the interference signal. Sample and hold circuits 38 and 39 are provided so that the K and T levels can be changed only at times when the noise threshold has been exceeded by an actual interference signal. The input to the horizontal (H) channel is multiplied by the constant K in amplifier 40 so that, for proper values of K, there will be an exact amplitude match at the amplitude comparator 36. The resultant amplitude and phase factors are then coupled to the signal controller and used as described above.

Although both FIGS. 1 and 2 cite the problem of a circularly polarized jammer or interference source, the invention is not constrained to such specific situations only. If for example, the interference source is horizontally polarized, it is readily seen from both FIGS. 1 and 2 and the same operational principle discussed above, that the interference at the receive line will be cancelled by the process described above. If, however, the jamming signal and the desired signal are vertically polarized, the simplified schematic arrangement shown in FIG. 1 will not be adequate for the cancellation of the jamming signal. One can remedy such situation by changing the polarization of the desired signal. Since a radar, provided with means of employing both linear and circular polarizations, can always react to select the polarization most suitable for its purpose in a jamming environment, a change of polarization of a radar signal usually does not pose any operational problems. For the circularly polarized radar case, it is seen that one can establish a port in the receive antenna line where there will be a predominant interference, in comparison with the desired signal. The signal from this port then could always be utilized to synthesize the appropriate cancellation interference as shown in FIG. 1.

From the foregoing, it may be seen that we have invented a system where an interfering signal may be cancelled provided that there is a difference of polarization between interference and desired signals. Further, where the interference and desired signals are similarly polarized, provision has been made to change the desired signal polarization to create said polarization differences.

This discussion has used radar as an illustrative embodiment. However, it is clear that this system can be used to cancel interference in any rf receiving system; including any kind of radio communication link.

The above described embodiments and methods are furnished as illustrations of the principle of this invention and are not intended to define the only embodiments possible in accordance with our teachings. Rather, protection under the United Stated Patent Law shall be afforded to us not only to the specific embodiment alone, but to those falling within the spirit and terms of the invention as defined in the following claims.

We claim:

1. Apparatus for receiving a wanted radio frequency signal in the presence of interference comprising:

a first antenna polarized in the same mode as the wanted radio frequency signal;

a second antenna polarized orthoginally with respect to said first antenna;

means coupling said first antenna substantially directly to a radio receiver for receiving said wanted radio frequency signal;

a signal controller coupled to said second antenna for varying the amplitude and phase of any signal received by said second antenna;

means subtractively combining the output of said signal controller with the signals present in said first antenna to radio receiver coupling means;

means for sampling the signals present between said subtractively combining means and said radio receiver;

a signal processor coupled to said sampling means and to said signal controller to receive signal samples in the polarization of said first and second antennas;

said signal processor including means for comparing the phase of signals derived from said first and second antennas;

said signal processor including means for comparing the amplitude of signals derived from said first and second antennas;

said signal processor including means for deriving the amplitude and phase correction constants for said signal controller from said comparing means; and means coupling the output of said signal processor to said signal controller for controlling the amount of phase and amplitude variation of said signal controller to produce a minimum interference signal at said sampling means.

2. Apparatus for receiving a wanted radio frequency signal in the presence of interference comprising;

a first antenna polarized in the same mode as the wanted radio frequency signal;

a second antenna polarized orthoginally with respect to said first antenna;

means coupling said first antenna substantially directly to a radio receiver for receiving said wanted radio frequency signal;

a signal controller coupled to said second antenna for varying the amplitude and phase of any signal received by said second antenna;

means subtractively combining the output of said signal controller with the signals present in said first antenna to radio receiver coupling means;

first and second sampling means, said first sampling means sampling first signals present between said subtractively combining means and said radio receiver;

a local oscillator;

a first mixer coupled to said local oscillator;

means introducing the output of said first sampling means into said first mixer whereby the signals sampled thereby are converted to an intermediate frequency;

said second sampling means sampling signals from said second antenna, a second mixer coupled to said local oscillator;

said second sampling means coupled to said second mixer to convert signals sampled from said second antenna to the same intermediate frequency as the output of said first sampling means;

a signal processor coupled to said first and second mixers and to said signal controller to receive signal samples in the polarization of said first and second antennas;

said signal processor including means for comparing the phase of signals derived from said first and second antennas;

said signal processor including means for comparing the amplitude of signals derived from said first and second antennas at said intermediate frequency.

* * * * *